US010678560B2

(12) United States Patent
Guidotti et al.

(10) Patent No.: US 10,678,560 B2
(45) Date of Patent: Jun. 9, 2020

(54) APPLYING CONFIGURATION SETTINGS TO A DEVICE

(71) Applicant: INTERNATIONAL BUSINESS MACHINES CORPORATION, Armonk, NY (US)

(72) Inventors: Alice Guidotti, Rome (IT); Marco Vettori, Rome (IT); Fabio Cerri, Rome (IT); Roberto Ragusa, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 113 days.

(21) Appl. No.: 16/053,685

(22) Filed: Aug. 2, 2018

(65) Prior Publication Data

US 2020/0042329 A1 Feb. 6, 2020

(51) Int. Cl.
*G06F 9/44* (2018.01)
*G06N 20/00* (2019.01)
*G06F 21/62* (2013.01)
*G06F 9/445* (2018.01)

(52) U.S. Cl.
CPC ...... *G06F 9/44505* (2013.01); *G06F 21/6245* (2013.01); *G06N 20/00* (2019.01)

(58) Field of Classification Search
CPC .. G06F 9/44505; G06F 21/6245; G06N 20/00
See application file for complete search history.

(56) References Cited

U.S. PATENT DOCUMENTS

| 5,945,988 | A | 8/1999 | Williams et al. |
| 6,029,196 | A | 2/2000 | Lenz |
| 8,019,692 | B2 * | 9/2011 | Rosen ............... G06Q 30/02 |
| | | | 705/319 |
| 8,136,090 | B2 * | 3/2012 | Boss ............... G06F 9/44505 |
| | | | 717/120 |
| 9,575,776 | B2 | 2/2017 | De Andrade Cajahyba et al. |
| 2006/0123080 | A1 | 6/2006 | Baudino et al. |
| 2006/0123081 | A1 | 6/2006 | Baudino et al. |
| 2013/0297927 | A1 * | 11/2013 | Bora .................. G06F 9/4451 |
| | | | 713/100 |
| 2017/0351388 | A1 | 12/2017 | Grunewald et al. |

\* cited by examiner

*Primary Examiner* — Stefan Stoynov
(74) *Attorney, Agent, or Firm* — Cuenot, Forsythe & Kim, LLC

(57) ABSTRACT

For a user group to which a first user is assigned, a plurality of configuration settings on client devices used by respective other users in the user group can be identified. A respective homogeneity score can be assigned to each of the identified plurality of configuration settings. For each of the respective configuration settings, at least one configuration setting value can be selected as a candidate configuration setting value based on, at least in part, the homogeneity score assigned to each configuration setting. The candidate configuration setting value for each confirmation setting can be communicated to a client device used by the first user, wherein the client device sets at least one of the configuration settings with a respective candidate configuration setting value.

20 Claims, 3 Drawing Sheets

200

For a user group to which a first user is assigned, identify a plurality of configuration settings on client devices used by respective other users in the user group
202

Assign, using a processor, a respective homogeneity score to each of the identified plurality of configuration settings, the homogeneity score assigned to each configuration setting based on, at least in part, a homogeneity of the configuration setting among the client devices used by the respective other users in the user group
204

*For each configuration setting for which at least one configuration setting value is identified, assign a relevancy score for each of the at least one configuration setting value, the relevancy score for each of the at least one configuration setting value indicating a relevancy of the configuration setting value to the user group*
206

For each of the respective configuration settings, select at least one configuration setting value as a candidate configuration setting value based on, at least in part, the homogeneity score assigned to each configuration setting
208

Communicate the candidate configuration setting value for each configuration setting to a client device used by the first user, wherein the client device sets at least one of the configuration settings with a respective candidate configuration setting value
210

FIG. 2

APPLYING CONFIGURATION SETTINGS TO A DEVICE

BACKGROUND

The present invention relates to data processing systems, and more specifically, to the configuration of data processing systems.

It is not uncommon for people to own and/or use a plurality of data processing systems, for example a smart phone, a tablet computer, a home computer and a work computer. Each of these data processing systems typically have numerous different configuration settings. Although people may choose to leave many of the configuration settings in their default state, often this is not the case. Indeed, each time a data processing system is acquired, the person (or an information technology specialist) will spend time configuring the data processing system to optimize the data processing system for use by the person or people that will be using the data processing system. For example, the data processing system may be configured to automatically connect to on one or more networks (e.g., wide area networks, local area networks and/or personal area networks), utilize one or more virtual private networks (VPNs), etc. The data processing system also may be configured with certain applications installed that will be used by the user, configuration settings for the applications, user preferences, and so on.

SUMMARY

A method can include, for a user group to which a first user is assigned, identifying a plurality of configuration settings on client devices used by respective other users in the user group. The method also can include assigning, using a processor, a respective homogeneity score to each of the identified plurality of configuration settings, the homogeneity score assigned to each configuration setting based on, at least in part, a homogeneity of the configuration setting among the client devices used by the respective other users in the user group. The method also can include, for each of the respective configuration settings, selecting at least one configuration setting value as a candidate configuration setting value based on, at least in part, the homogeneity score assigned to each configuration setting. The method also can include communicating the candidate configuration setting value for each configuration setting to a client device used by the first user, wherein the client device sets at least one of the configuration settings with a respective candidate configuration setting value.

A system includes a processor programmed to initiate executable operations. The executable operations can include, for a user group to which a first user is assigned, identifying a plurality of configuration settings on client devices used by respective other users in the user group. The executable operations also can include assigning a respective homogeneity score to each of the identified plurality of configuration settings, the homogeneity score assigned to each configuration setting based on, at least in part, a homogeneity of the configuration setting among the client devices used by the respective other users in the user group. The executable operations also can include, for each of the respective configuration settings, selecting at least one configuration setting value as a candidate configuration setting value based on, at least in part, the homogeneity score assigned to each configuration setting. The executable operations also can include communicating the candidate configuration setting value for each configuration setting to a client device used by the first user, wherein the client device sets at least one of the configuration settings with a respective candidate configuration setting value.

A computer program product includes a computer readable storage medium having program code stored thereon. The program code is executable by a data processing system to initiate operations. The operations can include, for a user group to which a first user is assigned, identifying a plurality of configuration settings on client devices used by respective other users in the user group. The operations also can include assigning a respective homogeneity score to each of the identified plurality of configuration settings, the homogeneity score assigned to each configuration setting based on, at least in part, a homogeneity of the configuration setting among the client devices used by the respective other users in the user group. The operations also can include, for each of the respective configuration settings, selecting at least one configuration setting value as a candidate configuration setting value based on, at least in part, the homogeneity score assigned to each configuration setting. The operations also can include communicating the candidate configuration setting value for each configuration setting to a client device used by the first user, wherein the client device sets at least one of the configuration settings with a respective candidate configuration setting value.

BRIEF DESCRIPTION OF THE DRAWINGS

FIG. 2 is a flowchart illustrating an example of a method of initiating a configuration of a client device.

DETAILED DESCRIPTION

Figure 1:
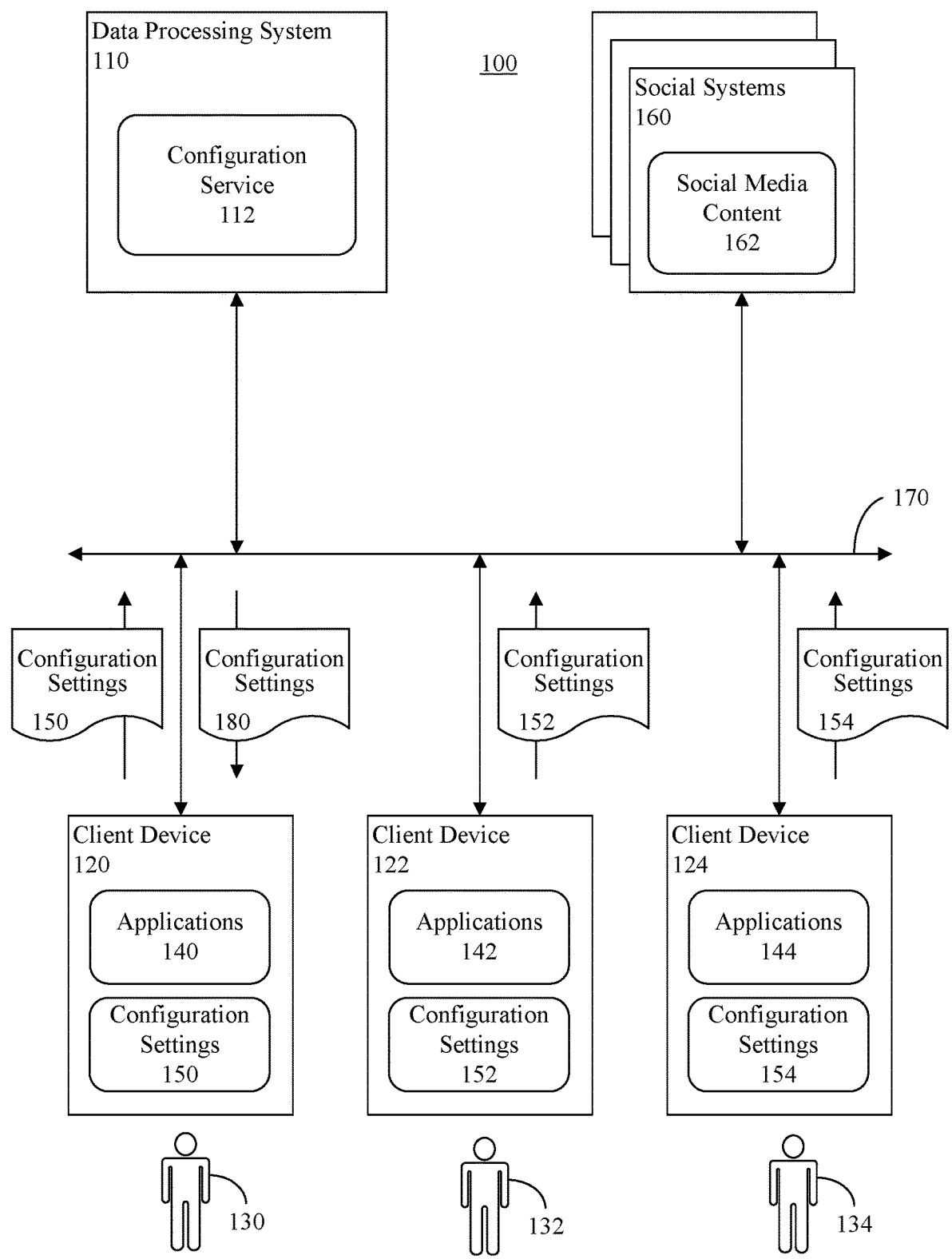
FIG. 1 is a block diagram illustrating an example of a computing environment.

This disclosure relates to data processing systems, and more specifically, to the configuration of data processing systems. In accordance with the inventive arrangements disclosed herein, a data processing system (hereinafter "system") can collect information about a user of a client device, including but not limited to, work and home locations, hobbies, activities, interests, activities (workouts), expenses, attended events, likes, and so on. The system can identify the user's coworkers, family, and friends, based on location information, networks, public records, etc. The system can identify user groups to which the user belongs, and create user groups when they do not already exist (e.g., family and close friends, sports groups, hobby groups, etc), including user groups having users who the user knows and user groups having users who the user does not know. The system also can identify the primary use of the client device by the user (e.g., work use or personal use).

The system can identify configuration settings of client devices in one or more user groups to which the user belongs, apply homogeneity scores to the configuration settings and, based at least in part on the homogeneity scores, select configuration setting values to apply to the configuration settings on the user's client device. The client device can be configured with the selected configuration setting values. For instance, if users in a user group tend to delete or change an application used for some purpose, this modification can be applied to the user's client device. Also, for instance, if there is a new application on the market adapted by users in a user group, such application can be installed and configured on the user's client device. The system also can refine the collected information by analyzing the behavior of the user and other users at runtime.

The arrangements described herein can greatly simplify the process of configuring a client device for a user and, more particularly, the manner in which the user will be using the client device. In this regard, the processes described herein can identify configuration settings on client devices used by other users in user groups to which the user is assigned that likely will need to be set on the user's client device. Further, the processes can identify configuration setting values set on the client devices of the other users, and apply those configuration setting values to the configuration settings on the user's client device. For example, configuration settings pertinent to the manner in which the user will use the client device in a work context can be set with configuration setting values optimal for the work context. Similarly, configuration settings pertinent to the manner in which the user will use the client device in a personal context can be set with configuration setting values optimal for that context. This can save the user a significant amount of time that otherwise would be spent interacting with the client device to configure the client device for the manner in which the user will be using it, thus improving the user's experience using the client device. In illustration, the arrangements described herein can improve user interface settings of the client device for the manner in which the user will be using the client device.

Several definitions that apply throughout this document now will be presented.

As defined herein, the term "user group" means a group comprising a plurality of users.

As defined herein, the term "configuration setting" means a setting on a data processing system, such as a client device, that is set to configure the data processing system for use by a user.

As defined herein, the term "configuration setting value" means a value that is assigned, or that is to be assigned, to a configuration setting of a data processing system, such as a client device.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

FIG. 1 is a block diagram illustrating an example of a computing environment 100. The computing environment can include a data processing system 110 (e.g., one or more servers) hosting a configuration service 112, and a plurality of client devices 120, 122, 124 used by users 130, 132, 134. Each client device 120, 122, 124 can host applications 140, 142, 144 and configuration settings and their respective values (hereinafter "configuration settings") 150, 152, 154. The configuration settings 150-154 can be configuration settings for the applications 140-144, as well as hardware components and services provided of the client devices 120-124.

Optionally, the computing environment 100 can include one or more social systems 160. The social systems 160 can be data processing systems (e.g., servers) that host social media, for example websites and/or applications dedicated to forums, microblogging, social networking, social bookmarking, social curation, collaboration (e.g., social collaboration and/or work collaboration), wikis, electronic communications (e.g., electronic mail (e-mail), instant messaging, text messaging, etc.), and so on. The social media can host social media content 162, for example, social media posts, blog posts, articles, work items, tasks, chats, e-mails, text messages, instant messages, etc.

The data processing system 110, client devices 120-124 and, optionally, the social systems 160 can be communicatively linked via at least one communication network 170. The communication network 170 is the medium used to provide communications links between various devices and data processing systems connected together within the computing environment 100. The communication network 170 may include connections, such as wire, wireless communication links, or fiber optic cables. The communication network 170 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or similar technologies.

In operation, the configuration service 112 can implement machine learning to determine, in real time, configuration settings (including the values of the configuration settings) 150, 152, 154 for each client device 120, 122, 124 subscribing to the configuration service 112 based on the configuration settings of other client devices 120-124 subscribing to the configuration service 112, and automatically configure the client devices 120-124 by setting the configuration settings 150-154. In this regard, each of the users 130-134 of the client devices 120-124 subscribing to the configuration service 112 can authorize the configuration service 112 to monitor the configuration settings 150-154 of the client devices 120-124, as well as other information, for example user activity on social systems 160, etc. In an arrangement, via a user interface presented on the client devices 120-124 (e.g., a graphical user interface presented in a web browser or mobile application), each user 130-134 can choose which configuration settings 150-154 and/or information the configuration service 112 is authorized to monitor on the respective client device 120-124. The configuration service 112 can monitor those configuration settings 150-154 and/or information authorized by the respective users 130-134. Further, each user 130-134 can indicate a primary use of their respective client devices 120-124 (e.g., work use, personal use, etc.)

To configure each client device 120-124, the configuration service 112 can perform a ramp-up phase and a configuration phase. The configuration service 112 also can perform a runtime phase to update configuration settings of the client devices 120-124. The following examples will describe a ramp-up phase and a configuration phase for the client device 120, though it will be understood to those skilled in the art that the processes described herein can be used for the ramp-up phases and configuration phases for the client devices 122, 124, as well as any other client devices using the configuration service 112. Moreover, the configuration service 112 can perform ramp-up phases for certain client devices 120-124 while performing configuration phases and/or runtime phases for other client devices 120-124.

During the ramp-up phase for the client device 120, the configuration service 112 can gather information to understand to which groups of users 130-134 the user 130 belongs (e.g., to which the user is assigned), and identify configuration settings 150-154 (and other user preferences) for each of the other users 132-134 in one or more of those user groups. For example, the configuration settings 150-154 (and other user preferences) can be identified for each of the client devices in two or more of the user groups. In an arrangement, the two or more user groups can include each of the user groups to which the user 130 belongs. If the configuration service 112 identifies a particular user group to which the user 130 should belong, but that user group does not already exist, the configuration service 112 can create the user group.

In illustration, the configuration service 112 can determine a family/cohabitant user group to which the user 130 is assigned by identifying other users 132-134 who are family members and/or cohabitants of the user 130. The configuration service 112 can do so by determining the location (e.g., a geographic location identified using a global positioning system (GPS)) of the user 130 during non-working hours, for example in the evening or at night, and/or by analyzing use of the social systems 160 by the user 130 and other users.

The configuration service 112 can determine a work user group to which the user 130 belongs by identifying other users 132-134 who are co-workers and/or clients of the user 130. The configuration service 112 can do so by determining the location (e.g., a geographic location identified using a GPS) of the user 130 during working hours and/or analyzing use of the social systems 160 by the user 130 and other users.

The configuration service 112 can determine a friend user group to which the user 130 belongs by identifying other users 132-134 who are friends (e.g., close friends) of the user 130. The configuration service 112 can do so by analyzing use of the social systems 160 by the user 130 and other users. Such analysis can include identifying locations (e.g., restaurants, movie theaters, etc.) and events where the social systems are used.

The configuration service 112 can determine a shared interest user group to which the user 130 belongs by identifying other users 132-134 who have interests (e.g., hobbies, sports, activities, etc.) in common with the user 130. The configuration service 112 can do so by analyzing use of the social systems 160 by the user 130 and other users, determining the attendance and/or activities of the users 130-134 at particular locations and/or events (e.g., concerts, sporting events, parks, beaches, restaurants, theaters, exhibitions, hiking trails, etc.), tracking activities expenses pertaining to hobbies, sports, activities, etc., questionnaires completed by the users 130-134, and so on.

Further, the configuration service 112 can determine to which user groups the user 130 belongs, at least based in part, by analyzing configuration settings 150 chosen by the user 130 and matching the chosen configuration settings 150 to configuration settings 152, 154 chosen by other users 132-134. In illustration, the client devices 122-124 each can communicate their respective current configuration settings 152-154, including current configuration setting values, to the configuration service 112 via the communication network 170.

The configuration service 112 can determine configuration settings (e.g., preferences) of each of the users 132-134. An example of such configuration settings 152-154 can be applications downloaded to and/or installed on the respective client devices 122-124 and the application types (e.g., business applications, non-business applications (e.g., games, hobby related, etc.), and so on. Another example of such configuration settings 152-154 can be applications primarily used by each of the respective users 132-134, the manner in which the applications are configured (e.g., general settings, notification settings, etc.), and configuration options selected for the applications. Another example of such configuration settings 152-154 can be customizations of the respective client devices 122-124 (e.g., background picture, profile picture, language settings, keyboard settings, presentation & grouping of the applications, etc.). Still, the configuration service 112 can determine other configuration settings 152-154, and the present arrangements are not limited to these examples.

The configuration service 112 can store data pertaining to the configuration settings 152-154 and data pertaining to each of the determinations made by the configuration service 112 to one or more computer readable storage mediums of the data processing system 110 and/or to which the data processing system 110 is communicatively linked. For example, the configuration service 112 can store the data to one or more databases. Further, the configuration service 112 can monitor the configuration settings 152-154 over time, make subsequent determinations, and store corresponding data to the database(s).

Further, the configuration service 112 can assign each of the determined configuration settings 152-154 to a determined user group. In illustration, the configuration service 112 can assign configuration settings 152-154 of users 132-134 to the user group the user 132-134 is assigned. For example, for users 132-134 in a work user group of the user 130, their configuration settings 152-154 for business related applications can be assigned to the work user group. For users 132-134 in the family/cohabitant user group of the user 130, their configuration settings 152-154 for non-business related applications can be assigned to the family/cohabitant user group. For users 132-134 in the friend user group of the user 130, their configuration settings 152-154 for non-business related applications can be assigned to the friend user group. For users 132-134 in the shared interest user group of the user 130, their configuration settings 152-154 for applications related to the shared interest can be assigned to the shared interest user group, and so on. The configuration service 112 can store data pertaining the user groups to which the determined configuration settings 152-154 are assigned to the one or more computer readable storage mediums, for example to the one or more databases.

Each user configuration settings 152-154 assigned to a user group can be a tuple in a list of configuration settings 152-154 for that user group. Moreover, a plurality of segments can be defined for each list of configuration settings 152-154 for the user group. By way of example, a list can include a segment indicating applications downloaded (e.g., Application1, . . . , ApplicationN), a segment indicating applications used (e.g., Application1, . . . , ApplicationN), a segment indicating languages set (e.g., Language1, . . . , LanguageN), a segment indicating profile pictures (e.g., Picture1, . . . , PictureN), a segment indicating types of electronic communication used among users 132-134 in the user group (e.g., e-mail, text messaging, instant messaging, . . . ), and so on.

Further, for each segment of the list of user preferences, the configuration service 112 can indicate the configuration settings 152-154 set on the respective client devices 120, 124 (e.g., GroupOfPrefs1: Pref11, . . . , Pref1N; GroupofPrefs2: Pref21, . . . , Pref2N). In illustration, for each application indicated in applications downloaded segment, the configuration service 112 can indicate in the list the configuration settings 152-154 for that application on each of the client devices 122-124 to which the applications have been downloaded. For each application indicated in applications used segment, the configuration service 112 can indicate in the list the configuration settings 152-154 for that application on each of the client devices 122-124 on which the applications are used. For each language indicated in the languages segment, the configuration service 112 can indicate in the list which configuration settings 152-154 on the client devices 122-124 are set to that language. For each profile picture in the profile pictures segment, the configuration service 112 can indicate which applications are set with that profile picture. For each electronic communication type in the electronic communication segment, the configuration service 112 can indicate the configuration settings 152-154 on each of the client devices 122-124 for that type of electronic communication, and so on.

For the user 130, the configuration service 112 can maintain a matrix indicating groups of configuration settings (including their values) 152-154 vs. user groups. The matrix can indicate, for each group of configuration settings 152-154, a weighted and ranked list of the user groups to which the user 130 belongs and from which configuration settings 152-154 for that group may be applied to the client device 120. The configuration service 112 can choose configuration setting values to apply to the configuration settings (including their values) 150 of the client device 120 based on the weightings assigned to the groups for the particular configuration settings 152-154. The configuration service 112 can determine the matrix is determined during ramp-up phase based on the most common configuration settings 152-154, but can refine the matrix based on further determinations made, and machine learning implemented, by the configuration service 112 during operation of the various client devices 120-124.

In illustration, each configuration setting 152-154 can be classified in relation to user groups. For each user group, each configuration setting 152-154 can be considered more or less relevant to the user group according to a homogeneity analysis performed by the configuration service 112. Using the homogeneity analysis, the configuration service 112 can derive a homogeneity score for each configuration setting 152-154, for example in a range from a minimum value of 0 to a maximum value of 100, based on a homogeneity of the configuration setting among the user group. For instance, the homogeneity analysis can count a number of client devices 122-124 used by users in the user group which have a particular configuration setting 152-154, determine a value set for the configuration setting 152-154 on each client device 122-124, and determine a number of different vales used by the client devices 122-124 for the configuration setting. Using the homogeneity analysis, the configuration service 112 can determine the homogeneity score for each configuration setting 152-154 based on the above determinations.

By way of example, assume there are twenty client devices 122-124 used by users 130-134 in a particular user group and, among the client devices 122-124, there are five different distinct values set for the configuration setting 152-154 being used (e.g., three client devices 122-124 have the configuration setting 152-154 set to a first value, five client devices 122-124 have the configuration setting 152-154 set to a second value, four client devices 122-124 have the configuration setting 152-154 set to a third value, six client devices 122-124 have the configuration setting 152-154 set to a fourth value, and two client devices 122-124 have the configuration setting 152-154 set to a fifth value). The configuration service 112 can determine the homogeneity score (HS) for the configuration setting 152-154 using the following equation:

$$HS = 100 * \left(1 - \frac{count\_distinct\_values}{count\_values}\right); \qquad \text{Equation 1}$$

where,
count_values=the number of client devices used by users of a particular user group that have a configuration setting value set for the configuration setting, and
count_distinct_values=the number of different distinct configuration setting values for the configuration setting among the client devices used by users of the particular user group.

In the present example, count_values=20 and count_distinct_values=5. Applying these values to equation 1 gives 100*(1−5/20)=75 for the homogeneity score, which indicates high homogeneity of the configuration setting 152-154. Homogeneity scores equal to or less than 10 can indicate low homogeneity of the configuration setting 152-154 for the user group, homogeneity scores from 11 to 50 can indicate medium homogeneity of the configuration setting 152-154 for the user group, and homogeneity scores greater than 50 can indicate high homogeneity of the configuration setting 152-154 for the user group. In one aspect, the configuration service 112 can increase the homogeneity score for client devices 122-124 belonging to a user group pertaining to the primary use of the client device 120 by the user 130 by applying weightings to the homogeneity scores. For example, if the user 130 indicates the primary use of the client device 120 is for work, the configuration service 112 can increase the homogeneity score determined in equation 1 for configuration settings 152-154 of other users in the work user group of the user 130. For instance, the configuration service 112 can increase the homogeneity score for such configuration settings 152-154 by a certain percentage (e.g., 10%, 20%, 30%, 40%, 50%, etc.). Accordingly, the homogeneity score for configuration settings 152-154 can reflect the applicability of the configuration settings 152-154 to the primary use of the client device 120 by the user 130.

For each configuration setting 152-154 under consideration, the configuration service 112 can filter out user groups that have a low homogeneity score for that configuration setting 152-154. For example, each user group having a homogeneity score equal to or less than 10 for the particular configuration setting 152-154 can be filtered out. Thus, the values set for the configuration setting 152-154 on client devices 122-124 used by users in those user groups no longer need be considered.

The configuration service 112 can assign a relevancy score to each of the configuration setting values of user groups that are not filtered out. The relevancy score assigned to each configuration setting value can indicate a relevancy of the configuration setting value to the user group to which the configuration setting is assigned and, by nature of the user being assigned to the user group, the relevancy of the configuration setting value to the user. For each configuration setting value, the relevancy score can be based on a frequency the value is used for a particular configuration setting 152-154 among client devices 122-124 of users in the user group (e.g., the number client devices 122-124 of users in the user group that have the particular configuration setting 152-154 set to that value), and the homogeneity score assigned to that configuration setting 152-154. The configuration service 112 can determine the relevancy score (RS) for the configuration setting value using the following equation:

$$RS = \sum_{G=1}^{N} \left( \frac{\text{count\_value\_use}_G}{\text{count\_values}_G} \right) * HS_G; \qquad \text{Equation 2}$$

where,
G is a user group to which the user, for whom the particular configuration setting is being determined, belongs,
count_value_use=the number of times a particular configuration setting value is used for the configuration setting among the client devices used by users of the particular user group,
count_values=the number of client devices used by users of the particular user group that have a configuration setting value set for the configuration setting, and
HS=homogeneity score determined for the configuration setting.

By way of example, assume that for a particular configuration setting count_value_use=3 and count_values=20 for a first user group to which the user 130 belongs (i.e., the value is used 3 times out of 20), and count_value_use=2 and count_values=5 for a second user group to which the user 130 belongs (i.e., the value is used 2 times out of 5). Also assume that the homogeneity score for that particular configuration setting in the first group is 60, and that the homogeneity score for that particular configuration setting in the second group is 40. Applying equation 2 to these values gives (3/20)*60+(2/5)*5=11 for the relevancy score of the configuration setting value.

Equation 2 can be applied for each value of the configuration setting, and values can be sorted and/or ranked by descending relevancy score. The configuration setting value having the highest relevancy score can be selected as a first candidate to be proposed and/or used as the value to apply the configuration setting 150 on the client device 120. For example, the system configuration service 112 can automatically select the highest ranked configuration setting value if the relevancy score assigned to that configuration setting value is at least double the relevancy score assigned to the next highest ranked configuration setting value), considering that this condition can represent proof that the highest ranked configuration setting value is indeed very appropriate. The configuration service 112 also may select a plurality of the highest ranked configuration setting values (e.g., the three highest ranked configuration setting values) as candidate configuration setting values.

For instance, the configuration service 112 may choose as a candidate configuration setting 180 a background configuration for the client device 120 and a value indicating a background used by the user's relatives, and, if that value is not present, the configuration service 112 can choose as a value of the candidate configuration setting 180 a value indicating a background used by the closest friends. Further, the configuration service 112 can choose applications to download to the client device 120 based on the applications downloaded by the user's family members, the user's closest friends, and the user's co-workers, depending on the relevancy scores assigned to the configuration settings 152-154 representing the applications being downloaded to the client devices 122-124.

Responsive to completion of the ramp up phase, the configuration service 112 is ready to initiate configuration of the client device 120. Responsive to the user 130 initially logging into the client device 120, the client device 120 can contact the configuration service 112 to acquire the configuration settings 180, for example by communicating a request to the configuration service 112 via the communication network 170. In response, the configuration service 112 can communicate the candidate configuration settings 180 to the client device 120, with an indication of the configuration setting 150 to which each of the selected configuration settings 180 apply. The client device 120 can set the configurations settings 150 in accordance with the candidate configuration settings 180 to configure the client device 120.

Not all configuration settings (including their values) 150 may be initially available on the client device 120. In illustration, the candidate configuration setting 180 can indicate whether the client device 120 is to install an application. Further, a configuration setting can include a configuration parameter/option (e.g., value) to be set for the application, and the candidate configuration setting 180 can indicate that configuration parameter/option. The configuration setting for the parameter/option may not be available to be set by the client device 120 until the application is actually installed on the client device 120. Thus, the client device 120 can set that configuration setting 150 with the value of the configuration setting 180 after the application is installed. In this regard, the client device 120 can store, at least temporarily, in a computer readable storage medium the configuration setting 180, and access the configuration setting to set the values for the configuration settings 150 when appropriate.

In the case that a configuration setting requires a value that is privacy sensitive (e.g. a WiFi™ password), the configuration service 112 can determine the homogeneity scores and relevancy scores using a hashed value to represent the configuration setting value for equations 1 and 2. The hashed values do not disclose the actual configuration setting values, but can be used to account for homogeneity. For such private values a reference to a device containing the value can be used in lieu of the value itself.

In an arrangement, in lieu of communicating a value for the configuration setting 180 to the client device 120, the configuration service 112 can communicate to the client device 120 the candidate configuration setting 180, without a value for the candidate configuration setting 180, and a message indicating at least one client device 122, 124 which has the appropriate value for the selected configuration setting. The indication can include, for example, an IP or MAC address of the client device 122, 124 and/or a user identifier for the user 132, 134. The client device 120 can be configured to contact a client device 122, 124 from which the value for configuration setting 180 may be obtained, and negotiate transfer of the value from the client device 122, 124 to the client device 120. For example, the client device 120 can communicate to the client device 122, 124 a message indicating a request to receive a value for the configuration setting 180. In response, the client device 122, 124 can present a message to the user 132, 134 requesting authorization to communicate the value for the configuration setting 180 to the client device 120 (e.g. a pop up window indicating to a user 132, 134 "smartphone called XYZ is asking to copy your WiFi password: Accept/Reject"). In response to the user accepting to share the value for the configuration setting 180 with the client device 120, the client device 120, 124 can communicate the value to the client device 120 to be applied to the configuration setting 180.

Regardless of whether the client device 120 receives the value for the candidate configuration setting 180 from the configuration service 112 or another client device 122, 124, responsive to receiving the candidate configuration setting 180 and the corresponding value, the client device 120 can set to the configuration setting 150 corresponding to candidate configuration setting 180 with the obtained value. The client device 120 can do so automatically in response to receiving the candidate configuration setting 180, or can present the candidate configuration setting 180 to the user 130, for example in a pop-up window, with a message asking the user 130 to choose whether to apply the value for the candidate configuration setting 180 to the configuration setting 150. If the user chooses to do so, then the client device 120 can apply the value to the configuration setting 150. If not, the client device 120 need not take any further action regarding the candidate configuration setting 180.

In an arrangement, in which the configuration service 112 communicates to the client device 120 a plurality of candidate configuration settings 180, the client device 120 can present the candidate configuration settings 180 to the user 130, for example in a pop-up window, with a message asking the user 130 to choose which candidate configuration setting 180 to apply to the configuration setting, or to choose to ignore the candidate configuration settings 180. If the user 130 selects a candidate configuration setting 180, the client device 120 can apply the selected candidate configuration setting 180 to the configuration setting 150. Otherwise, the client device 120 need not take any further action regarding the candidate configuration settings 180.

At completion of the configuration phase, the client device 120 can enter the runtime phase. During the runtime phase, the configuration service 112 can apply machine learning to determine additional candidate configuration settings 180, including values for the candidate configuration settings, for the client devices 122-124. For example, the client device 120 can communicate to the configuration service 112 updates to the configuration settings 150. The client device 120 can communicate the updates periodically, or responsive to the user 130 changing one or more of the configuration settings 150. Similarly, the client devices 122-124 can communicate to the configuration service 112 updates to their configuration settings 152-154.

Responsive to receiving the updates, the configuration service 112 can store the updated configuration settings 150-154 to a computer readable storage medium (e.g., to the database in which the configuration settings 150-154 are stored by the configuration service. Further, the configuration service 112 can update the previously described matrix for the client device 120, as well as matrixes for the client devices 122-124. The configuration service 112 also can update, for each of the client devices 120-124, the previously described homogeneity scores and relevancy scores. Based on the updated homogeneity scores and relevance scores, the configuration service 112 can determine new candidate configuration settings, and compare the new candidate configuration settings to previously provided candidate configuration settings 180. Based on the comparison, the configuration service 112 can determine which candidate configuration settings have changed based on the updates, and communicate to the respective client devices 120-124 the new candidate configuration settings applicable to those client devices 120-124 that are different than those candidate configuration settings previously provided to the respective client devices 120-124. The client devices 120-124 can change their configuration settings 150-154 based on the new candidate configuration settings, for example in a manner similar to that previously described.

In an aspect of the present arrangements, when a user 130-134 explicitly sets a configuration setting 150-154, the configuration service 112 can record that configuration setting 150-154, including a configuration setting value the user 130-134 may have set. The configuration service 112 can aggregate the configuration setting 150-154/value with the configuration setting/value data maintained by the configuration service 112, including an indicator indicating that the configuration setting 150-154 was explicitly set by the user 130-134. If the configuration setting 150-154 is assigned to a particular user group, the configuration setting 150-154 and configuration setting value can be added to the configuration settings 150-154 (e.g., preferences) assigned to that user group.

Further, responsive to the user 130-134 explicitly setting a configuration setting 150-154, the value assigned by the user to the configuration setting 150-154 can be assigned a weighted relevancy score that is higher than a relevancy score than otherwise would be assigned to the configuration setting value. For example, the configuration service 112 can increase the relevancy value determined in equation 2 by a certain percentage (e.g., 10%, 20%, 30%, 40%, 50%, etc.). Accordingly, configuration setting values set by users can be higher than they otherwise would be if they were default or predetermined configuration setting values.

In another aspect of the present arrangements, if a user 130-134 explicitly sets a number of configuration settings 150-154 in which the configuration setting values are common to a user group to which the user 130-134 is not assigned, and that number exceeds a threshold value, the configuration service 112 can assign the user 130-134 to that user group. In this regard, the configuration service 112 can determine that the user 130-134 has commonality with the user group based on the manner in which the user 130-134 explicitly sets the configuration settings 150-154. By way of example, if the user 130-134 sets a plurality of virtual private network (VPN) configuration settings to values that match the VPN configuration settings used by other users, the user 130-134 can be added to a user group that includes the other users.

FIG. 2 is a flowchart illustrating an example of a method 200 of initiating a configuration of a client device. The method 200 can be implemented by the data processing system 110 of FIG. 1, for example by the configuration service 112.

At step 202 the data processing system 110 can, for a user groups to which a first user is assigned, identify a plurality of configuration settings on client devices used by respective other users in the user group. The user group can be selected from a plurality of user groups to which the first user is assigned.

At step 204 the data processing system 110 can assign, using a processor, a respective homogeneity score to each of the identified plurality of configuration settings, the homogeneity score assigned to each configuration setting based on, at least in part, a homogeneity of the configuration setting among the client devices used by the respective other users in the user group. The data processing system 110 can determine each respective homogeneity score based on a number of client devices used by the other users in the user group that have a configuration setting value set for the configuration setting and a number of different distinct configuration setting values for the configuration setting among the client devices used by the other users of the user group.

Optionally, at step 206, the data processing system 110 can, for each configuration setting for which at least one configuration setting value is identified, assign a relevancy score for each of the at least one configuration setting value, the relevancy score for each of the at least one configuration setting value indicating a relevancy of the configuration setting value to the user group. The data processing system 110 can determine each respective relevancy score based on a number of client devices used by the other users in the user group that have a configuration setting value set for the configuration setting and a number of times the respective configuration setting value is used for the configuration setting among the client devices used by the other users of the user group.

At step 208 the data processing system 110 can, for each of the respective configuration settings, select at least one configuration setting value as a candidate configuration setting value based on, at least in part, the homogeneity score assigned to each configuration setting. Optionally, the at least one configuration setting value can be selected as the candidate configuration setting value further based on, at least in part, the relevancy score assigned to the at least one configuration setting value.

At step 210 the data processing system 110 can communicate the candidate configuration setting value for each configuration setting to a client device used by the first user, wherein the client device sets at least one of the configuration settings with a respective candidate configuration setting value.

In an aspect of the present arrangements, the data processing system 110 can perform steps 202, 204 and 206 of the method 200 for two or more of a plurality of user groups to which the first user is assigned. In a further arrangement, the data processing system 110 can perform steps 202, 204 and 206 of the method 200 for each of a plurality of user groups to which the first user is assigned. In such arrangements, the at least one configuration setting value selected as the candidate configuration setting value at step 208 and communicated to the client device used by the first user at step 210 can be selected from configuration setting values of the client devices in the user groups for which steps 202-206 are performed. For example, one or more candidate configuration setting values can be selected from a first user group to which the first user is assigned, one or more other candidate configuration setting values can be selected from a second user group to which the first user is assigned, and so on.

Figure 3:
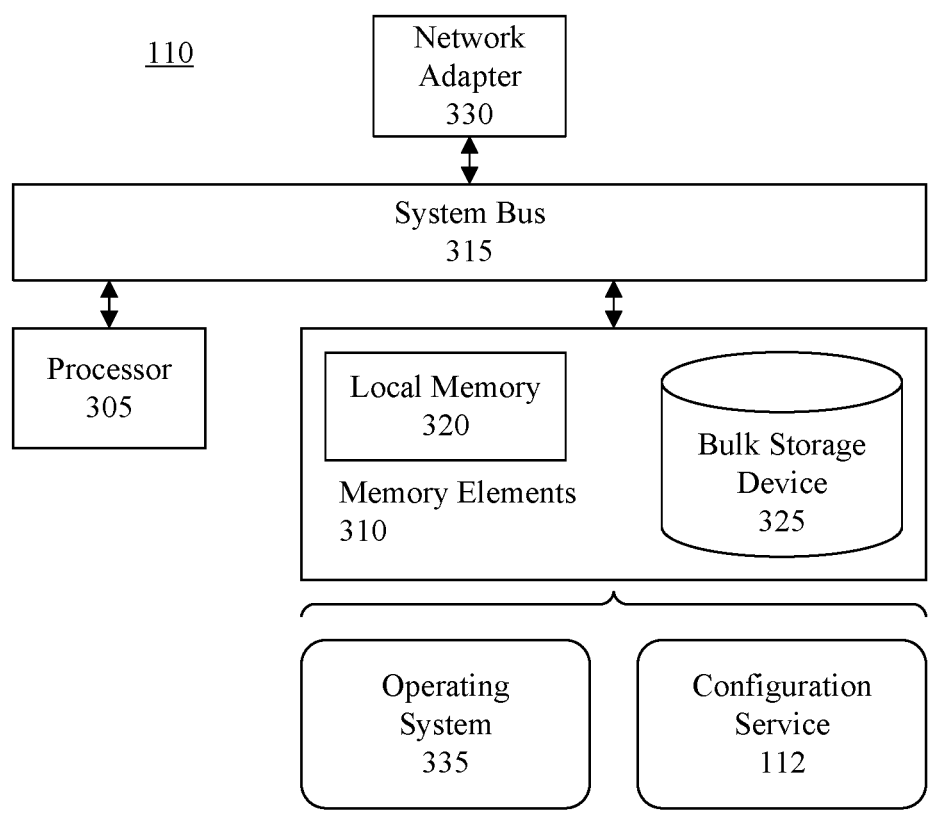
FIG. 3 is a block diagram illustrating example architecture for a data processing system.

FIG. 3 is a block diagram illustrating example architecture for a data processing system 110 of FIG. 1. The data processing system 110 can include at least one processor 305 (e.g., a central processing unit) coupled to memory elements 310 through a system bus 315 or other suitable circuitry. As such, the data processing system 110 can store program code within the memory elements 310. The processor 305 can execute the program code accessed from the memory elements 310 via the system bus 315. It should be appreciated that the data processing system 110 can be implemented in the form of any system including a processor and memory that is capable of performing the functions and/or operations described within this specification. For example, the data processing system 110 can be implemented as a server, a plurality of communicatively linked servers, and so on.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The data processing system 110 also can include one or more cache memories (not shown) that provide temporary storage of at least some program code in order to reduce the number of times program code must be retrieved from the bulk storage device 325 during execution.

One or more network adapters 330 also can be coupled to data processing system 110 to enable the data processing system 110 to become coupled to other systems, computer systems, remote printers, and/or remote storage devices through intervening private or public networks. Modems, cable modems, transceivers, and Ethernet cards are examples of different types of network adapters 330 that can be used with the data processing system 110.

As pictured in FIG. 3, the memory elements 310 can store the components of the data processing system 110, namely an operating system 335 and the configuration service 112. The configuration service 112 can be executed in a processing environment hosted by the operating system 335. Being implemented in the form of executable program code, these components of the data processing system 110 can be executed by the data processing system 110 and, as such, can be considered part of the data processing system 110. Moreover, the configuration service 112 is a functional data structure that imparts functionality when employed as part of the data processing system 110.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart(s) and block diagram(s) in the Figures illustrate the architecture, functionality, and operation of possible implementations of systems, methods, and computer program products according to various embodiments of the present invention. In this regard, each block in the flowchart(s) or block diagram(s) may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

for a user group to which a first user is assigned, identifying a plurality of configuration settings on client devices used by respective other users in the user group;

assigning, using a processor, a respective homogeneity score to each of the identified plurality of configuration settings, the homogeneity score assigned to each configuration setting based on, at least in part, a homogeneity of the configuration setting among the client devices used by the respective other users in the user group;

for each of the respective configuration settings, selecting at least one configuration setting value as a candidate configuration setting value based on, at least in part, the homogeneity score assigned to each configuration setting; and communicating the candidate configuration setting value for each configuration setting to a client device used by the first user, wherein the client device sets at least one of the configuration settings with a respective candidate configuration setting value.

2. The method of claim 1, further comprising:

determining each respective homogeneity score based on a number of client devices used by the other users in the user group that have a configuration setting value set for the configuration setting and a number of different distinct configuration setting values for the configuration setting among the client devices used by the other users of the user group.

3. The method of claim 1, further comprising:

for each configuration setting for which at least one configuration setting value is identified, assigning a relevancy score for each of the at least one configuration setting value, the relevancy score for each of the at least one configuration setting value indicating a relevancy of the configuration setting value to the user group;

wherein, for each of the respective configuration settings, the selecting the at least one configuration setting value as the candidate configuration setting value further is based on, at least in part, the relevancy score assigned to the at least one configuration setting value.

4. The method of claim 3, further comprising:

determining each respective relevancy score based on a number of client devices used by the other users in the user group that have a configuration setting value set for the configuration setting and a number of times the respective configuration setting value is used for the configuration setting among the client devices used by the other users of the user group.

5. The method of claim 1, further comprising:

during a runtime phase that occurs subsequent to the client device setting the at least one of the configuration settings with the respective candidate configuration setting value, applying machine learning to identify at least one additional candidate configuration setting value; and communicating the at least one additional candidate configuration setting value to the client device used by the first user, wherein the client device sets at least one respective configuration setting with at least one additional candidate configuration setting value.

6. The method of claim 1, further comprising:
identifying an additional configuration setting that requires a respective configuration setting value that is privacy sensitive; and
assigning a respective homogeneity score to the additional configuration setting using a hashed value to represent the configuration setting value that is sensitive.

7. The method of claim 6, further comprising:
communicating to the client device used by the first user a message indicating at least one of the client devices used by the respective other users which has the configuration setting value that is privacy sensitive, wherein the client device used by the first user is configured to negotiate transfer of the configuration setting value that is privacy sensitive from the at least one of the client devices used by the respective other users to the client device used by the first user.

8. A system, comprising:
a processor programmed to initiate executable operations comprising:
for a user group to which a first user is assigned, identifying a plurality of configuration settings on client devices used by respective other users in the user group;
assigning a respective homogeneity score to each of the identified plurality of configuration settings, the homogeneity score assigned to each configuration setting based on, at least in part, a homogeneity of the configuration setting among the client devices used by the respective other users in the user group;
for each of the respective configuration settings, selecting at least one configuration setting value as a candidate configuration setting value based on, at least in part, the homogeneity score assigned to each configuration setting; and
communicating the candidate configuration setting value for each configuration setting to a client device used by the first user, wherein the client device sets at least one of the configuration settings with a respective candidate configuration setting value.

9. The system of claim 8, the executable operations further comprising:
determining each respective homogeneity score based on a number of client devices used by the other users in the user group that have a configuration setting value set for the configuration setting and a number of different distinct configuration setting values for the configuration setting among the client devices used by the other users of the user group.

10. The system of claim 8, the executable operations further comprising:
for each configuration setting for which at least one configuration setting value is identified, assigning a relevancy score for each of the at least one configuration setting value, the relevancy score for each of the at least one configuration setting value indicating a relevancy of the configuration setting value to the user group;
wherein, for each of the respective configuration settings, the selecting the at least one configuration setting value as the candidate configuration setting value further is based on, at least in part, the relevancy score assigned to the at least one configuration setting value.

11. The system of claim 10, the executable operations further comprising:
determining each respective relevancy score based on a number of client devices used by the other users in the user group that have a configuration setting value set for the configuration setting and a number of times the respective configuration setting value is used for the configuration setting among the client devices used by the other users of the user group.

12. The system of claim 8, the executable operations further comprising:
during a runtime phase that occurs subsequent to the client device setting the at least one of the configuration settings with the respective candidate configuration setting value, applying machine learning to identify at least one additional candidate configuration setting value; and
communicating the at least one additional candidate configuration setting value to the client device used by the first user, wherein the client device sets at least one respective configuration setting with at least one additional candidate configuration setting value.

13. The system of claim 8, the executable operations further comprising:
identifying an additional configuration setting that requires a respective configuration setting value that is privacy sensitive; and
assigning a respective homogeneity score to the additional configuration setting using a hashed value to represent the configuration setting value that is sensitive.

14. The system of claim 13, the executable operations further comprising:
communicating to the client device used by the first user a message indicating at least one of the client devices used by the respective other users which has the configuration setting value that is privacy sensitive, wherein the client device used by the first user is configured to negotiate transfer of the configuration setting value that is privacy sensitive from the at least one of the client devices used by the respective other users to the client device used by the first user.

15. A computer program product, comprising:
a computer readable storage medium having program code stored thereon, the program code executable by a data processing system to initiate operations including:
for a user group to which a first user is assigned, identifying a plurality of configuration settings on client devices used by respective other users in the user group;
assigning a respective homogeneity score to each of the identified plurality of configuration settings, the homogeneity score assigned to each configuration setting based on, at least in part, a homogeneity of the configuration setting among the client devices used by the respective other users in the user group;
for each of the respective configuration settings, selecting at least one configuration setting value as a candidate configuration setting value based on, at least in part, the homogeneity score assigned to each configuration setting; and
communicating the candidate configuration setting value for each configuration setting to a client device used by the first user, wherein the client device sets at least one of the configuration settings with a respective candidate configuration setting value.

16. The computer program product of claim 15, wherein the program code is executable by the data processing system to initiate operations further comprising:

determining each respective homogeneity score based on a number of client devices used by the other users in the user group that have a configuration setting value set for the configuration setting and a number of different distinct configuration setting values for the configuration setting among the client devices used by the other users of the user group.

17. The computer program product of claim 15, wherein the program code is executable by the data processing system to initiate operations further comprising:

for each configuration setting for which at least one configuration setting value is identified, assigning a relevancy score for each of the at least one configuration setting value, the relevancy score for each of the at least one configuration setting value indicating a relevancy of the configuration setting value to the user group;

wherein, for each of the respective configuration settings, the selecting the at least one configuration setting value as the candidate configuration setting value further is based on, at least in part, the relevancy score assigned to the at least one configuration setting value.

18. The computer program product of claim 17, wherein the program code is executable by the data processing system to initiate operations further comprising:

determining each respective relevancy score based on a number of client devices used by the other users in the user group that have a configuration setting value set for the configuration setting and a number of times the respective configuration setting value is used for the configuration setting among the client devices used by the other users of the user group.

19. The computer program product of claim 15, wherein the program code is executable by the data processing system to initiate operations further comprising:

during a runtime phase that occurs subsequent to the client device setting the at least one of the configuration settings with the respective candidate configuration setting value, applying machine learning to identify at least one additional candidate configuration setting value; and communicating the at least one additional candidate configuration setting value to the client device used by the first user, wherein the client device sets at least one respective configuration setting with at least one additional candidate configuration setting value.

20. The computer program product of claim 15, wherein the program code is executable by the data processing system to initiate operations further comprising:

identifying an additional configuration setting that requires a respective configuration setting value that is privacy sensitive; and assigning a respective homogeneity score to the additional configuration setting using a hashed value to represent the configuration setting value that is sensitive.

* * * * *